(12) United States Patent
Reichel et al.

(10) Patent No.: US 8,764,879 B2
(45) Date of Patent: *Jul. 1, 2014

(54) PROCESS FOR SLAG FOAMING A NON-STAINLESS STEEL MELT IN AN ELECTRIC ARC FURNACE

(75) Inventors: Johann Reichel, Düsseldorf (DE); Lutz Rose, Duisburg (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/318,857

(22) PCT Filed: May 7, 2010

(86) PCT No.: PCT/EP2010/002813
§ 371 (c)(1),
(2), (4) Date: Nov. 4, 2011

(87) PCT Pub. No.: WO2010/127869
PCT Pub. Date: Nov. 11, 2010

(65) Prior Publication Data
US 2012/0048065 A1     Mar. 1, 2012

(30) Foreign Application Priority Data
May 8, 2009   (DE) .......................... 10 2009 020 494

(51) Int. Cl.
*C21B 15/00*     (2006.01)
*C21B 13/12*     (2006.01)

(52) U.S. Cl.
USPC ........................................... 75/500; 75/10.24

(58) Field of Classification Search
USPC .......................................................... 75/500
See application file for complete search history.

(56) References Cited

U.S. PATENT DOCUMENTS

| 4,767,449 | A  | * | 8/1988 | Rosen et al. ..................... 75/321 |
| 5,916,827 | A  | * | 6/1999 | Vayda .............................. 44/580 |
| 6,565,623 | B2 | * | 5/2003 | Contrucci et al. .............. 75/760 |

(Continued)

FOREIGN PATENT DOCUMENTS

| DE | 102006004532 | 8/2007 |
| DE | 102007006529 | 8/2008 |

(Continued)

*Primary Examiner* — Roy King
*Assistant Examiner* — Xiaowei Su
(74) *Attorney, Agent, or Firm* — Lucas & Mercanti, LLP; Klaus P. Stoffel

(57) ABSTRACT

During the production of non-stainless steel, slag containing a high proportion of metal oxides, primarily iron oxide, is formed during the smelting of the solid material in the electric arc furnace. The concentration of the iron oxide often reaches values of more than 20%. This slag has a poor foaming capability and does not permit the typical characteristics of a carbon steel slag to be achieved. In order to cause such a slag to foam, according to the invention it is proposed to load the electric arc furnace with pellets or briquettes (8) which consist of a defined mixture of an iron oxide carrier and an iron carrier as ballast material, of carbon as reducing agent and also of a binder material, which react in the electric arc furnace in a reducing manner, floating under the slag (7) in the steel melt (6). The reaction gases (12) produced in this way consist primarily of carbon monoxide and advantageously support the foaming of the slag.

10 Claims, 1 Drawing Sheet

(56) References Cited

U.S. PATENT DOCUMENTS

| | | |
|---|---|---|
| 8,043,401 B2 | 10/2011 | Reichel et al. |
| 8,043,402 B2 | 10/2011 | Reichel et al. |
| 2006/0260435 A1 | 11/2006 | Rose et al. |
| 2011/0197708 A1* | 8/2011 | Reichel et al. ............... 75/10.48 |

FOREIGN PATENT DOCUMENTS

| | | |
|---|---|---|
| EP | 0829545 B1 | 3/1998 |
| WO | 2004104232 | 12/2004 |
| WO | WO 2008095575 A1 * | 8/2008 |

* cited by examiner

PROCESS FOR SLAG FOAMING A NON-STAINLESS STEEL MELT IN AN ELECTRIC ARC FURNACE

The present application is a 371 of International application PCT/EP2010/002813, filed May 7, 2010, which claims priority of DE 10 2009 020 494.6, filed May 8, 2009, the priority of these applications is hereby claimed and these applications are incorporated herein by reference.

BACKGROUND OF THE INVENTION

The invention relates to a method of slag foaming a molten slag which in the production of non-stainless steel in an electric arc furnace is present on the steel melt, wherein shaped pieces, such as pellets or briquettes are added to the slag, and wherein the contents of the shaped pieces react with the Fe-oxides in a reducing manner by splitting off gas, and wherein the reaction gases that are produced lead to slag foaming.

When operating electric arc furnaces, solid materials which have been filled in, primarily scrap and alloys, are melted using the light arcs of the electrodes which project from above into the furnace vessel. In this case, in addition to its primary function which is to remove undesired components from the melt, the slag has a protective function because it partially fills out the space between the electrode ends and the metal surface and the refractory lining of the furnace protects against the radiation energy of the electric arc. This protective function of the slag can be improved by causing foaming of the slag by suitable methods.

During melting of the solid material in an electric arc furnace for manufacturing non-stainless steel, a slag is formed which contains a high proportion of metal oxides, primarily of Fe-oxide. The concentration of the iron oxide frequently reaches values greater than 20%.

The metallurgy of the process of such slags produces the following partial reactions which take place successively:

$\{O_2\}=2\{O\}$ Thermal dissociation of the oxygen $[Fe]+[O]=(FeO)$ Iron oxidation in the melt $[C]+(FeO)=[Fe]+\{CO\}$ Iron oxide reduction at the phase border slag/metal The last reaction is of fundamental importance for the manufacture of carbon steel because iron oxide is the most important component in the foamed slag formation. If the slag viscosity is suitable for maintaining the foam, the simple blowing in of carbon and oxygen into the slag causes foaming, wherein the gaseous CO with its bubbles additionally intensifies the slag foaming, the gaseous CO being formed by the reduction process of the metal oxide with the carbon.

Decisive for the foam slag formation are the components of the added foam material as well as the slag viscosity which, in turn, depends on the composition and the temperature of the molten slag. Primarily, the viscosity defines a range of the state of the molten slag in which a foam formation is possible. Therefore, the control of the slag basicity responsible for the viscosity is important, whereby the produced gas bubbles are forced to temporarily remain in the slag layer. The limestone added in the foaming material constitutes another gas source because the thermal dissociation releases this material in accordance with the following equation CO:

$(CaCO_3)=(CaO)+\{CO\}$

The phenomenon of the bubble formation constitutes a process which utilizes the mechanical force of the reacting gas bubbles for producing a new surface area in the slag. The buoyancy forces acting on the gas bubbles split the slag surface temporarily and saturate the complete slag layer for producing the foam. In the case of a protracted gas flow from the reacting materials, the number of the accumulating bubbles increases with the increasing foam. As a consequence, the height of the foam layer increases with a growing quantity of gas; the quantity is directly proportional to the quantity of the foam material.

Important in such a mechanism is the optimum placement of the reaction substances in order to obtain a maximum foaming effect in this manner. The optimum placement takes place in the border area between the slag layer and the liquid metal.

In the manufacture of non-stainless steel, the slag foaming has in the past conventionally been started by means of blown-in carbon (coke, graphite, coal) and oxygen. This technology requires a complicated maintenance of blow-in systems and the use of oxygen and carbon carriers. This technology is not only complicated, but is also not very efficient in relation to the introduced components, because dusts which have been blown in (including $Fe_2O_3$) are in the case of an incorrect blow-in angle for the most part removed from the reduction process by the furnace suctioning system.

EP 0829 545 B1 describes a method for manufacturing a foam slag on molten stainless steel in an electric furnace, wherein into the slag is introduced a powder by an injection medium, for example, nitrogen, which is composed of a metal oxide, either zinc oxide or lead oxide, and carbon. The oxide contained in the powder is reduced by reacting with the carbon. This causes the formation of bubbles in the slag which are composed essentially of carbon monoxide and cause the slag to foam. Because the added powder has a relatively large surface area, a short vigorous reaction with the slag occurs which additionally takes place locally limited in the vicinity of the injection or blow-in device in the melt bath.

In order to avoid the disadvantages of introducing pulverous substances, it is proposed, in WO 2004/104232, for manufacturing a foamed slag on a high chromium containing steel melt, to add the materials used for foaming the slag, as a mixture of metal oxide and carbon, as shaped pieces which are compressed and/or provided with a binding agent into the electric furnace. The density of these shaped pieces is adjusted in such a way that they float and react in the metal and near the phase border melt/slag.

In DE 10 2007 006 529 A1, in manufacturing a foamed slag on a high chromium-steel melt additionally the metal oxides present in the slag, primarily chromium oxide, are reduced by the briquettes or pellets floating near the phase border melt/slag, wherein the produced reaction gases intensify the slag foaming. For this purpose, the briquettes or pellets added to the electric arc furnace are composed of a defined mixture of an iron carrier as a ballast material of carbon or carbon and silicone as a reduction agent as well as a binder.

SUMMARY OF THE INVENTION

In order to be able to reduce the complicated maintenance of blowing systems and the undesired valuable substance losses through the blowing in of the oxygen and carbon carriers, also in the production of non-stainless steel in an electric arc furnace, it is the object of the invention to provide a method of slag foaming of a non-stainless steel melt in which the positive findings which have been made in connection with slag foaming of chromium-containing slags by the addition of pressed shaped pieces into the electric arc furnace are also taken into consideration.

This object is met by the present invention in that the pellets or briquettes added to the electric arc furnace are composed of a defined mixture of an iron oxide carrier, limestone, ballast material and a carbon carrier as reduction agents as well as a binder material, wherein the pellets or briquettes are manufactured with respect to their density in such a way that they float in the steel melt near the phase border melt/slag and react underneath the slag layer in a reducing manner with the iron oxide carriers of the pellets/briquettes, and wherein the duration of dissolution of the pellets or briquettes resulting from their size and density lead to an optimum reduction of the iron oxide in relation to the efficiency and duration.

In order to achieve with the iron oxide reduction at the phase border slag/metal within the pellet/briquettes a sufficient foaming level and foaming quality, the composition of the pellets or briquettes varies, for example, within the following ranges:

coke>5%
iron oxide carrier>20%
limestone 0-15%
ballast material>20%
binder<6%.

In dependence on the steel grade to be manufactured, different quantities of pellets or briquettes having such a composition mentioned as an example are added, wherein the variable quantity is in the range of numbers 10 to 40 kg/t of liquid steel.

In order to ensure that the pellets or briquettes according to the invention float in the melt near the phase border melt/slag, so that they can react chemically underneath the slag layer with the iron oxide carrier of the briquettes, their density is adjusted in such a controlled manner that it is with values of between 3 to 4 t/m$^3$ between the density of the slag and the density of the metal melt (4 to 9 m$^3$/t).

This density is achieved by an appropriately adjusted mixing ratio of limestone, ballast material and reduction agent, as well as by compacting during the shaping of the mixture into pellets or briquettes. To ensure that the pellets or briquettes float near the phase border melt/slag and react uniformly slowly, in addition to their density also their size has an influence; therefore, its average dimensions are adjusted to preferably between about H 50×L 60×B 60 mm.

Specifically, it has been found that pellets or briquettes containing fine steel scrap meet the density requirements, limestone improves the gas formation, and briquettes having a density of more than 3.2 t/m$^3$ ensure a placement directly underneath the slag.

Good slag foaming depends on the slag viscosity. Low temperatures (1,500° C. to 1,550° C.) correspond to a low basicity (lime not completely dissolved), higher temperatures (1,600° C. to 1,650° C.) correspond to a higher basicity (lime completely dissolved). Since both factors operate oppositely, the temperature and the basicity of the slag are continuously monitored and appropriately controlled.

In order to achieve a high foaming effect, at the beginning of foaming a sufficient slag height must be present on the steel melt. Therefore, an appropriate slag level control is carried out before and during foaming. Prior to the control of the slag level, a minimum slag quantity of >60 kg/t should be ensured.

For producing the pellets or briquettes, in accordance with the invention, dry or wet residual materials, which are by-products of the manufacture of various steel products, are used.

The ballast material is predominantly composed of the element iron of which the non-stainless steels are made, wherein, in accordance with an advantageous further development of the invention, used as ballast material are low-alloy fine scrap having a density of about 7 t/m$^3$ is used finely shredded. In accordance with the invention, the carbon carrier contained in the pellets or briquettes is coke. However, other carbon carriers such as, for example, coal, can also be used as reduction material.

In order to permit such mixtures to be pressed into pellets or briquettes, a suitable binder material is necessary. Molasses and cement have proven effective, alternatively it is also possible to use bitumen, pitch, calcium hydrate and plant materials, like cellulose.

In the manufacture of the pellets or briquettes it is important that the produced shape and size as well as the compacting which has taken place is adapted to their later use. In the present case, it is demanded that the dissolution duration during its reaction with the contents of the slag is adapted to an optimum reduction. Therefore, they should be thermally stable and should not melt immediately after being introduced into the hot electric arc furnace. Moreover, with respect to their shape, size and strength they should be configured in such a way that a pneumatic transport or a simple charging through the furnace cover and from there through the fifth cover hole into the electric arc furnace are possible.

Additional details and advantages of the invention are in the following explained in more detail with the aid of schematic drawing figures of an embodiment.

DETAILED DESCRIPTION OF THE INVENTION

Figure 1:
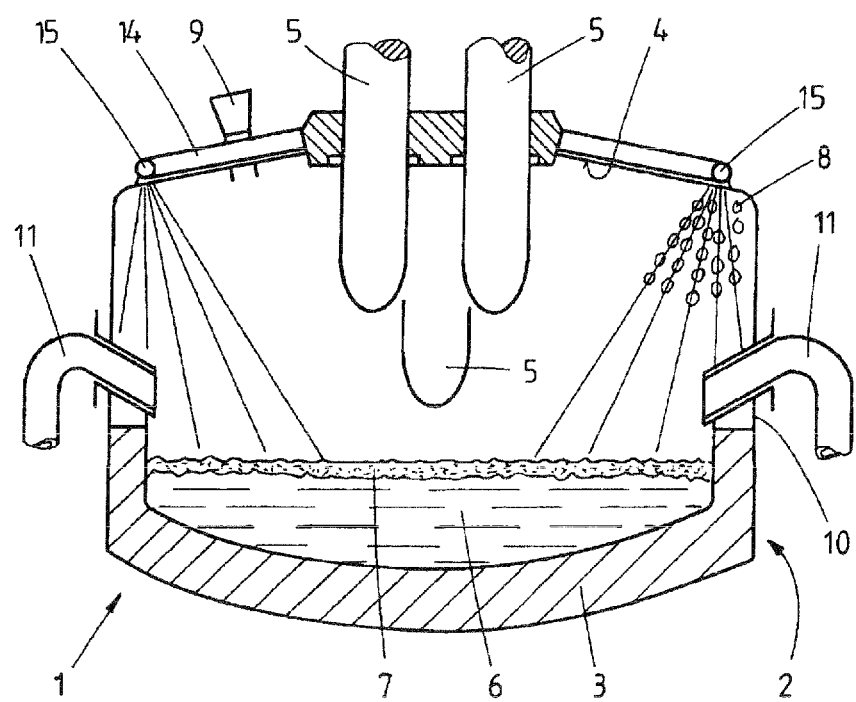
FIG. 1 shows a sectional view of an electric arc furnace with charging devices for pellets or briquettes.

The electric arc furnace 1 shown in FIG. 1 is composed of a furnace vessel 2 with refractory wall 3 and a furnace cover 4 as well as three electrodes 5 which are guided from above through the furnace cover 4 into the furnace vessel 2. In the lower part of the furnace vessel 2 is present within the refractory wall 3 a steel melt 6 with a liquid slag 7 above the steel melt 6. The pellets or briquettes 8 are added through a cover hole 9 directly to the melt by gravity or, for example, by a gravity conveyor system (the gravity conveyor system is not illustrated) into the furnace interior and from there into the annular space between the lateral furnace wall 10 and the circle of electrodes formed by the electrodes 5. Alternatively, the pellets or briquettes 8 can be introduced into the furnace interior by a pneumatic or mechanical conveyor system by means of an annular line 14, which runs radially to the furnace cover 4, with charging openings 15, or pneumatically, or by means of gravity through inlet devices 11 arranged in the side walls 10 of the furnace.

Figure 2:
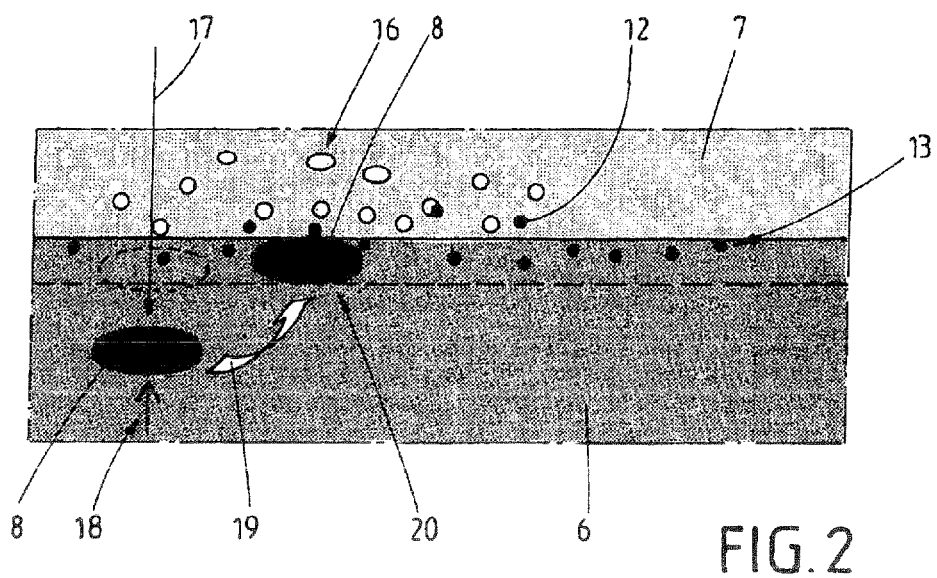
FIG. 2 is a view, on a larger scale, of the phase border formed by the steel melt with the slag floating thereabove.

FIG. 2 illustrates, on a larger scale, the area of the phase border melt/slag 13 formed by the slag 7 and the steel melt 6. The arrow direction 17 indicates a possible path of a briquette 8 introduced into the electric arc furnace 1. After passing through the slag 7, the briquette is within the melt 6, but still clearly underneath the phase border melt/slag 13. Because of the existing density differences with respect to the melt, the briquette then reaches due to its buoyancy force 18 in a possible upward movement 19, and further floating in the melt 6, the desired end position 20 directly underneath the phase border melt/slag 13. In this position 20 located underneath the slag 7, a reduction of the iron oxide then takes place with carbon within the briquette. The reaction gases 16 released during this reaction, predominantly carbon monoxide are indicated as small circles, and the briquette residues 12 remaining after these reactions are illustrated as black dots in the slag 7. Because of the now changed composition, these briquette residues 12 can also partially float in the slag 7.

| List of Reference Numerals | |
|---|---|
| 1 | Electric arc furnace |
| 2 | Furnace vessel |
| 3 | Refractory furnace wall |
| 4 | Furnace cover |
| 5 | Electrodes |
| 6 | Steel melt |
| 7 | Slag |
| 8 | Pellets or briquettes |
| 9 | Cover hole |
| 10 | Side walls of the furnace |
| 11 | Blow-in line |
| 12 | Pellets or briquette residues |
| 13 | Phase border melt/slag |
| 14 | Annular line |
| 15 | Charging openings |
| 16 | Reaction gases |
| 17 | Feeding direction of the pellets or briquettes in the steel melt |
| 18 | Buoyancy force of the pellets or briquettes in the steel melt |
| 19 | Possible upward movements of the pellets or briquettes in the steel melt |
| 20 | Desired end position of the pellets or briquettes in the steel melt |

The invention claimed is:

1. A method of slag foaming of a molten slag present on a steel melt during manufacture of non-stainless steel in an electric arc furnace, the method comprising adding pellets or briquettes to the slag, whose contents react in a reducing manner with Fe-oxides while splitting off gas, wherein reaction gases produced lead to slag foaming, the pellets or briquettes charged into the electric arc furnace are of a defined mixture of an iron oxide carrier, limestone, ballast material, and a carbon carrier as reduction agent, as well as a binder, wherein the pellets or briquettes are manufactured with respect to density so that the pellets or briquettes float in the steel melt directly underneath a phase border melt/slag, and react in a reducing manner underneath the slag layer with the iron oxide and carbon contained in the pellets or briquettes, and wherein a dissolution duration of the pellets or briquettes resulting from their size and density causes a reduction of the iron oxide, wherein the pellets or briquettes have a composition that varies within the following ranges:

| | |
|---|---|
| Coke | >5 wt. % |
| Iron oxide carrier | >20 wt. % |
| Limestone | 0-15 wt. % |
| Ballast material | >20 wt. % |
| Binder material | <6 wt. %, | the method including adjusting the density of the pellets or briquettes to values of between 3 to 4 tons/m$^3$, and average dimensions of the pellets or briquettes to values between a height of 10 to 50 mm, a length of 10 to 60 mm and a width of 10 to 50 mm.

2. The method according to claim 1, including adding different quantities of pellets or briquettes to the slag in a range of 10 to 40 kg/ton liquid steel in dependence on the steel grade to be manufactured.

3. The method according to claim 1, including using dry or wet residual materials, which are produced by manufacture of various steel products, for manufacturing the pellets or briquettes.

4. The method according to claim 3, including using low-alloy fine scrap having a density of about 7 tons/m$^3$ for manufacturing the pellets or briquettes.

5. The method according to claim 1, wherein molasses and/or bitumen and/or cement, calcium hydrate and plant materials are used as binder materials.

6. The method according to claim 5, wherein the plant materials are cellulose.

7. The method according to claim 1, wherein the pellets or briquettes are formed with respect to shape, size and density so as to be pneumatically or mechanically transportable.

8. The method according to claim 7, wherein the adding step includes adding the pellets or briquettes through a furnace cover and from there through a fifth cover hole or through a blow-in line.

9. The method according to claim 1, including reinforcing the dissolution duration of the pellets or briquettes necessary for a reduction of the iron oxide by an adjustment of slag viscosity, the adjustment including continuously monitoring and controlling temperature and basicity of the slag.

10. The method according to claim 1, including carrying out slag level control prior to and during slag foaming.

\* \* \* \* \*